United States Patent [19]

Passarelli

[11] Patent Number: 5,016,200

[45] Date of Patent: May 14, 1991

[54] WEIGHT DETERMINING APPARATUS UTILIZING ACOUSTIC WAVE ELAPSED TIME MEASUREMENT AND COMPUTER

[76] Inventor: Frank Passarelli, 323 S. Church La., Los Angeles, Calif. 90049

[21] Appl. No.: 428,832

[22] Filed: Oct. 30, 1989

[51] Int. Cl.⁵ .................. G01G 11/00; G01G 19/08
[52] U.S. Cl. ................................ 364/567; 364/508; 364/569; 177/136; 73/597; 73/862.39
[58] Field of Search ............... 364/567, 508, 506, 569; 177/210 R, 137, 136; 73/597, 581, 580, 862.69, 862.59, 862.62, 862.39

[56] References Cited

U.S. PATENT DOCUMENTS

| | | |
|---|---|---|
| 3,575,050 | 4/1971 | Lynnworth ................... 73/861.27 |
| 4,505,344 | 3/1985 | Hobbs et al. .................. 177/136 |
| 4,623,029 | 11/1986 | Bambauer et al. .............. 177/137 |
| 4,926,692 | 5/1990 | Brokowski et al. ............. 73/597 |

FOREIGN PATENT DOCUMENTS 0879300 11/1981 U.S.S.R. .

OTHER PUBLICATIONS

"Measurement of Applied and Residual Stresses Using an Ultrasonic Instrumentation System", B. E. Gordon, Jr., ISA Transactions, vol. 19, No. 2 (1980).

Primary Examiner—Parshotam S. Lall
Assistant Examiner—S. A. Melnick
Attorney, Agent, or Firm—Jack C. Munro

[57] ABSTRACT

A method and apparatus for determining of weight on a structure which utilizes an acoustic wave transmitting transducer and an acoustic wave receiving transducer. The elapsed time of transmission of the acoustic wave between the transmitting transducer and the receiving transducer varies according to the amount of weight on the load bearing member within the structure upon which the transducers are fixedly mounted. By determining of the elapsed time and comparing of such to a computer to a known weight versus elapsed time curve, the current weight can be determined for the structure.

14 Claims, 5 Drawing Sheets

PIEZOELECTRIC

ELECTRO-MAGNETIC

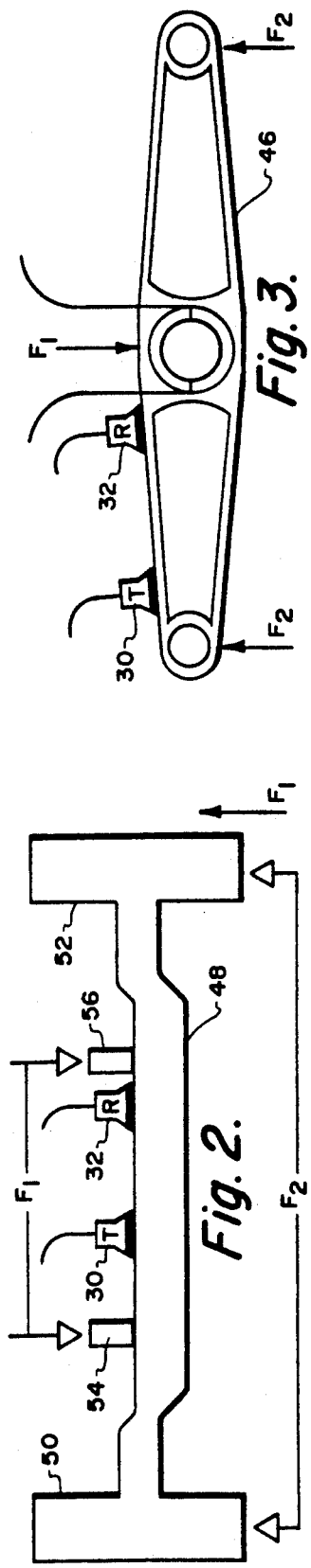

$V_S$ = 12 VOLTS  $V_3$ = −10.0 VOLTS
$V_1$ = +5.0 VOLTS  $V_4$ = ±100 VOLTS
$V_2$ = +10.0 VOLTS  $V_5$ = 3.0 VOLTS

WEIGHT DETERMINING APPARATUS UTILIZING ACOUSTIC WAVE ELAPSED TIME MEASUREMENT AND COMPUTER

BACKGROUND OF THE INVENTION

The field of this invention relates to weight determining devices and more particularly to a weight determining device which does not require the use of any separate weighing device in order to ascertain the weight of a given structure.

The subject matter of this invention will be discussed in conjunction with motor vehicles and more particularly in conjunction with trucks. However, it is to be understood that it is within the scope of this invention that the weight could be utilized in environments other than motor operated vehicles and actually within any environment where it is desired to determine the weight of an object without the using of any separate scale mechanism.

Trash trucks are designed to move from house to house, or business to business, and collect accumulated trash which has been placed in an appropriate collecting container to be picked up by the individuals operating the trash trucks. Trash trucks are normally required by municipalities, which generally is a city or a county, to restrict its weight to no greater than a certain value. Since the individuals operating the trash truck are constantly picking up additional weight, it is merely guesswork by the operators of the trash truck as to how much weight has actually been accumulated. This guesswork frequently results in the truck being overweight. Most municipalities are quite diligent in determining which trucks are overweight and if they are overweight a fine is assessed. Generally, these fines are based on the amount of pounds that the truck is overweight. It is not at all uncommon for an overweight truck to receive a fine of several thousand dollars.

A business which operates a plurality of trash trucks may have to pay fines of several thousand dollars in a given month. These fines are actually totally unnecessary and if there was some convenient and quick way the trash truck operator could discover the weight of the truck, the trash truck operator could then stop adding additional trash when the truck weight was at its maximum and then proceed to the dumping facility for the trash so that the truck could be emptied. The truck could then be operated back to its place where the truck stopped picking up the trash and the truck could then continue on its route.

Previously, it has been known to incorporate some type of weighing device in conjunction with the truck. However, all previous type of such weighing devices involve the use of a strain gauge. The strain gauge is mounted on a load bearing member such as an axle of the truck. The strain gauge is to be placed at the center of the bending moment of the axle, in other words, the point on the axle which flexes the greatest. The problem with strain gauges is that they encounter fatigue. The constant bending and non-bending movement of the axle results in the deterioration of the strain gauge. As a result, the strain gauge frequently breaks or otherwise become inoperative. Prior to becoming inoperative, the strain gauge will result in substantially inaccurate weight readings. The weight calculated by the strain gauge would appear to not have the truck overloaded when in fact the truck would be overloaded.

Another way in which trucks can be weighed without placing the truck on a scale is through the use of a load cell. However, such load cells are required to be installed within some point of the vehicle which will encounter the weight of the load on the truck. These load cells require that the truck be somewhat dismantled so the load cell can be installed. Load cells also have the problem that they deteriorate over time and become inaccurate. These load cells are continuously subjected to the weight of the load and also to variations of this as the truck is vibrated during normal operation. It is this constant subjecting to load and the varying of the load weight that results in deterioration of the load cell.

Prior to the development of the structure of the present invention, there has not been known any type of load weighing device that could be quickly and easily mounted on the structure of the truck without requiring any dismantling of the truck and that operated reasonably accurate over a long period of time without deterioration and also was unaffected by typically encountered weather conditions such as rain, cold, heat, snow and mud.

SUMMARY OF THE INVENTION

The structure of the present invention utilizes one or more pairs of transmitting and receiving transducers. These transmitting and receiving transducers can either be a piezoelectric or electro-magnetic. These transducers are to be applied onto a load bearing member of the truck such as on the axle. These transducers are located in a spaced apart known distance apart. The transmitting transducer is designed to emit an acoustical wave. The receiving transducer is designed to pick up an acoustical wave. Both transducers are connected to a computer. Within the computer the elapsed time of the acoustical wave from the transmitter to the receiver is measured. As the weight of the truck increases, the stress on the load bearing member on the axle increases. As the stress increases, the acoustical wave travels faster. It is a substantially lineal relationship that as the load increases so does lineally the elapsed time of transmission of the wave. This lineal representation is plotted within the computer. Therefore, when the computer receives a reading and compares such to the known lineal curve, a weight value can be arrived at. This weight value is then displayed by an appropriate numerical display. Activation of the weight determining device is to be accomplished manually by the operator of the truck.

The primary objective of the present invention is to construct a weight determining apparatus which can be quickly and easily attached to a truck or other similar structure which is to be weighed without requiring any dismantling of that structure.

Another objective of this invention is to construct a weight determining apparatus which will weigh structures with a reasonable degree of accuracy and will maintain that accuracy over an extended period of usage.

Another objective of the present invention is to construct a weight determining apparatus which will continue to operate accurately even when subjected to adverse conditions such as water, heat, cold, mud and dirt and also is not affected by fatigue or other yielding of the load bearing member on which it is mounted.

BRIEF DESCRIPTION OF THE DRAWINGS

FIG. 2 is a bending moment diagram of a first form commonly used axle configuration for a typical trash truck upon which has been mounted the transmitting and receiving transducers utilized in conjunction with the present invention;

FIG. 3 is a bending moment diagram of a second form of commonly used axle of a trash truck upon which has been mounted the transmitting and receiving transducers included within the weight determining apparatus of the present invention;

FIG. 4 is an overall electronic block diagram of the weight determining apparatus of the present invention;

DETAILED DESCRIPTION OF THE SHOWN EMBODIMENT

Figure 1:
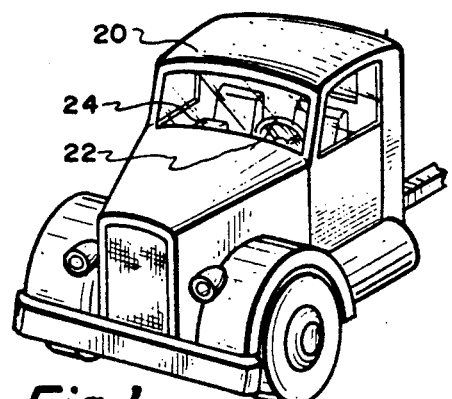
FIG. 1 is an isometric view of the cab portion of a typical truck that the weight determining apparatus of the present invention could be typically utilized.

Referring particularly to FIG. 1, there is shown the cab 20 of a conventional truck. Cab 20 includes a driver's compartment within which is located a steering wheel 22 and a dashboard (not shown). The console 24 is generally depicted as being mounted on the dashboard. That console is to contain a series of manually operated buttons as well as some form of display which in all probability would be a digital display composed of light emitting diodes which will display a numerical value which would be weight that is being measured. Referring particularly to FIG. 4, of the drawings, the buttons that would be operated by the operator of the truck would be located on keypad 26. The digital display is generally shown as block 28 in FIG. 4. Many of the electronic components depicted in block diagram in FIG. 4 may be included within the console 24. However, such inclusion is not mandatory and may be mounted in other areas of the cab 20 or even in areas of the truck that are not shown in FIG. 1.

The weight determining apparatus of this invention includes a series of transmitting transducers 30 and a series of receiving transducers 32. These transducers 30 and 32 are acoustical, that is, the transmitting transducers 30 produce a sound wave. The receiving transducers 32 pick up that sound wave. These transducers 30 and 32 can be constructed in any manner that is deemed to be desirable. It has been found that it is possible to use either a piezoelectric transducer or an electro-magnetic transducer.

Figure 8:
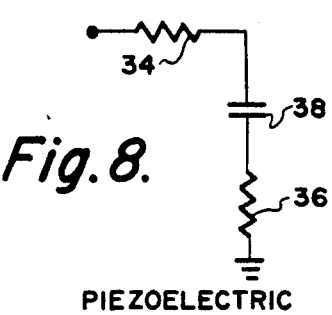
FIG. 8 is an electrical schematic diagram of a piezoelectric transducer.
Figure 9:
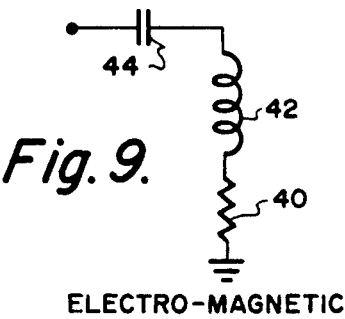
FIG. 9 is an electrical schematic of an electro-magnetic transducer to be mountable directly onto either axle shown in FIGS. 2 and 3.

The basic equivalent electrical circuit for a piezoelectric transducer is shown in FIG. 8 basically this circuit load appears to the power amplifier as a pair of resistors 34 and 36 which are electrically mounted in series with a capacitor 38. The equivalent circuit for the electromagnetic type of transducer is depicted within FIG. 9 which is comprised of a series arrangement of a resistor 40, an inductor 42 and a capacitor 44. Both the piezoelectric and the electro-magnetic transducer function to produce a physical vibration on or in a structure. It is that vibration that is the acoustical wave. Generally the structures utilized are metallic and comprise a load bearing member of the structure that is to be weighed. In the case of a truck, a typical load bearing member would be an axle which is mounted between a pair of wheels of a truck. A typical truck may have anywhere from two to twenty or more axles. On each axle is to be mounted a transmitting transducer 30 and a receiving transducer 32. These transducers 30 and 32 are mounted in a spaced apart arrangement with this spacing being known and preselected.

Referring particularly to FIGS. 2 and 3 of the drawings, there is schematically shown two different types of typical load bearing members, or axles, for trucks. Within FIG. 2 there is shown an axle 46 which is to have mounted at opposite ends thereof wheels through which the reaction force $F_2$ is transmitted. Main load force $F_1$ is subjected to the axle 46 at its approximate center point. A transmitting transducer 30 and a receiving transmitter 32 is to be fixedly mounted onto the axle 46 in the approximate manner that is shown.

It is noted that the transducers 30 and 32 are mounted on one continuous span of the axle 46, in other words, between load $F_1$ and a wheel reaction force $F_2$. It would normally not be desirable to mount transducers 30 and 32 in a manner to have $F_1$ be located therebetween. As force $F_1$ increases and bending of the axle 46 increases, the stress within axle 46 is increased. In terms of the molecular structure of the metallic material of the axle 46, the molecules of the axle 46 somewhat tightly pack together. It has been found that for most metallic materials that if one were to chart an elapsed time versus weight curve, that such would be substantially lineal although lineal is not necessary for the present invention. Any curve representation can be dealt with satisfactorily.

What is meant by lineal is if there is no load within the truck, only the weight of the truck itself and that portion of the truck weight that is transmitted through axle 46 is represented by $F_1$. $F_2$ will equal one-half of $F_1$. At this particular weight, an acoustic wave will be transmitted through transmitting transducer 30 and the elapsed time of this transmission is noted when such is picked up by receiving transducer 32. Now, increase $F_1$ a known weight such as five thousand pounds. Another acoustic wave will be transmitted from transducer 30 and picked up by transducer 32 and that elapsed time accurately measured. The same procedure is repeated for ten thousand pounds, fifteen thousand pounds, twenty thousand pounds, etc. In a graphical representation where weight would be the X-axis and elapsed time would be the Y-axis, it would be discovered that the resultingly formed graph would be in essence a straight line.

It is to be understood that in actual practice, the transducers 30 and 32 will be tightly fixedly mounted to the axle 46. In all probability the transducers 30 and 32 will be tightly clamped in position in some manner on the axle 46 and may also include some form of an adhesive. However, the exact transducer clamping arrangement for the axle 46 is not specifically described since numerous different types of transducer fixing means could be utilized without departing from the scope of this invention. If a piezoelectric transducer is utilized, it must be in intimate contact with the axle. The operating portion of the electro-magnetic transducer may be slightly spaced from the axle.

As shown in FIG. 4, there are three in number of the transmitting transducers 30 and three in number of the receiving transducers 32. In actual practice, there may be utilized a substantially increased number of transducers with it to be understood that there is a transmitting transducer 30 and a receiving transducer 32 for each axle 46. A typical truck may have seven axles. There may be utilized a pair of such transducers 30 and 32 on each axle and by the operator pushing appropriate buttons on the keypad 26, a weight value for a selected axle will be displayed in the display 28. This procedure is to be repeated for each axle. However, it is considered to be within the scope of this invention that the user may not place a pair of transducers on each and every axle as it only may be necessary to determine the weight of one axle or even only two or three of the axles.

Referring particularly to FIG. 2, there is shown a different type of axle 48. This axle 48 is connected again between wheels 50 and 52. The wheels 50 and 52 combine to produce the reaction force which is called $F_2$. Mounted on the upper surface of the axle 48 are a pair of beams 54 and 56 located in a spaced apart manner. The load $F_1$ will normally be equally distributed between the beams 54 and 56. The transmitting transducer 30 and the receiving transducer 32 are to be fixedly mounted onto the axle 48 between the beams 54 and 56. Again, the spacing between the transducers 30 and 32 is known.

It is to be understood that the apparatus of this invention could be utilized in conjunction with other configurations of axles other than axles 48 and 46 without departing from the scope of this invention.

The basic operation of this invention is generally depicted within FIG. 4. The human operator initiates a measurement sequence through the keypad 26. This measurement sequence is supplied by a computer 58. The computer 58 has been initially preprogrammed through memory 60 with the elapsed time versus weight for the specific axle of the truck that is to be measured. It is to be understood that although most trucks have the same type of axles, it is possible that there may be utilized two or three different types of axles within the same truck. In other words, a given truck may have an axle 46 and also an axle 48. The computer is to be supplied appropriate data for each axle and when that particular axle is activated, only the data that is pertinent to that axle is to be called upon within the computer 58.

Power to both the computer 58 and the memory 60 is supplied by power supply 62. The power supply 62 is supplied input power which is denoted as Vs from a source which is a conventional twelve volt battery which is a common voltage for batteries within motor vehicles. However, it is considered to be within the scope of this invention that any input source of power could be utilized and even if the input source is different than twelve volts, the appropriate electrical components of the apparatus of the present invention could be modified accordingly.

The computer 58 transmits a signal through peripheral controllers 64 to a timing and control circuit 66. Within the timing and control circuit 66, there is generated a pulse which is amplified by power amplifier 68 and supplied into a directional coupler 70. A portion of this signal is fed back through a conductor 72 to a filter amplifier 74. Part of the power being supplied to filter amplifier 74 is transmitted from power supply 62 through conductor 76. This feedback signal from the filter amplifier 74 is transmitted through conductor 75 into a zero crossing sector 78 and back into the timing and control circuit 66.

The main signal from the directional coupler 70 is transmitted to a relay 80. The relay 80 activates one of the transmitting transducers 30. At the same time, the relay 80 is coupled to relay 82. Relay 82 receives the signal from the receiving transducers 32. When relay 80 is coupled to transmitting transducer A, at the same time relay 82 is coupled to transducer A of the receiving transducer 32. This insures that only a single pair of the transducers are activated at a given time and only that pair that are mounted on an axle.

The acoustic wave is now propagated through the axle with the timing being initiated by the timing and control circuit 66. This signal, when picked up by the receiving transducer A is amplified by amplifier 84 prior to being supplied to the relay 82 and then into filter amplifier 74. From the filter amplifier 74 the signal is transmitted through the zero crossing detector 78 and into the timing and control circuit 66. The elapsed time between the transmitting and receiving of the signals is determined and transmitted into the computer 58 where it is interpolated. This interpolated weight value is then displayed numerically by the display 28.

Figure 11:
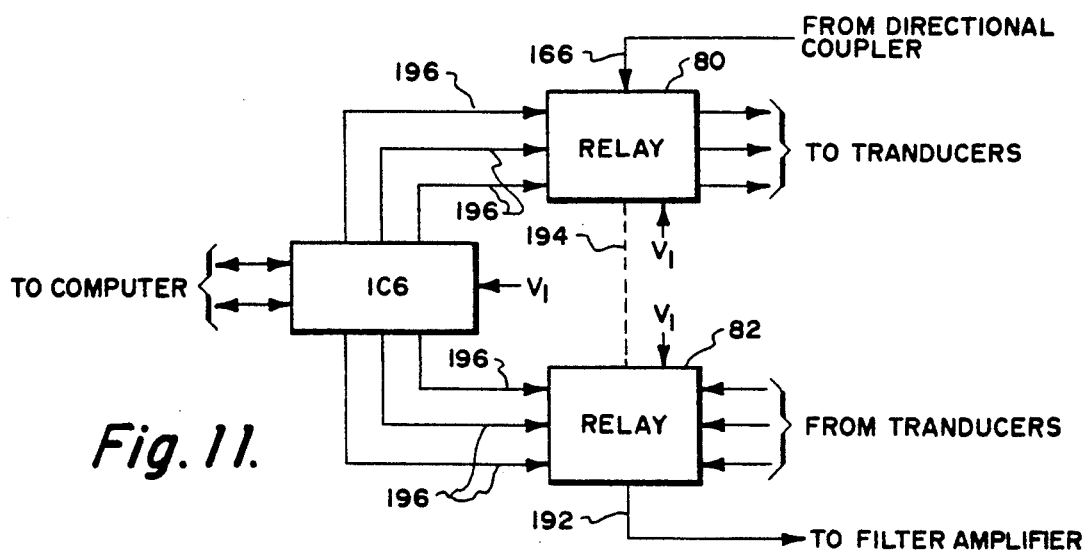
FIG. 11 is an electronic schematic of a peripheral controller and relay combination.

The computer 58 is conventionally available and could be any one of a variety of eight or sixteen bit designs. A desirable unit is model "Wildcard 88" that is manufactured by Intel Corporation in Santa Clara, Calif. This model of computer is complete with the exception of a display, a keyboard and a random access memory. Seen in FIG. 4, the computer 58 has connected thereto a keypad 26, display 28 and memory 60. Also, to be associated with the computer 58 is interface circuitry in the form of peripheral controllers 64. The peripheral controllers 64 is actually composed of three identical units with Model No. 8255A, which is also manufactured by Intel Corporation, has been found to be most satisfactory. The general purpose of the peripheral controllers 64 is to interface peripheral equipment to the computer 58. The configuration of Model No. 8255A of Intel Corporation is programmed by software so that normally no external logic is necessary to interface peripheral devices. The peripheral controllers shown as a block diagram in FIG. 4 actually comprises three in number of separate units, which as previously mentioned are identical. These three separate units are shown as IC6 in FIG. 11, and IC7 and IC10 in FIG. 5.

Figure 5:
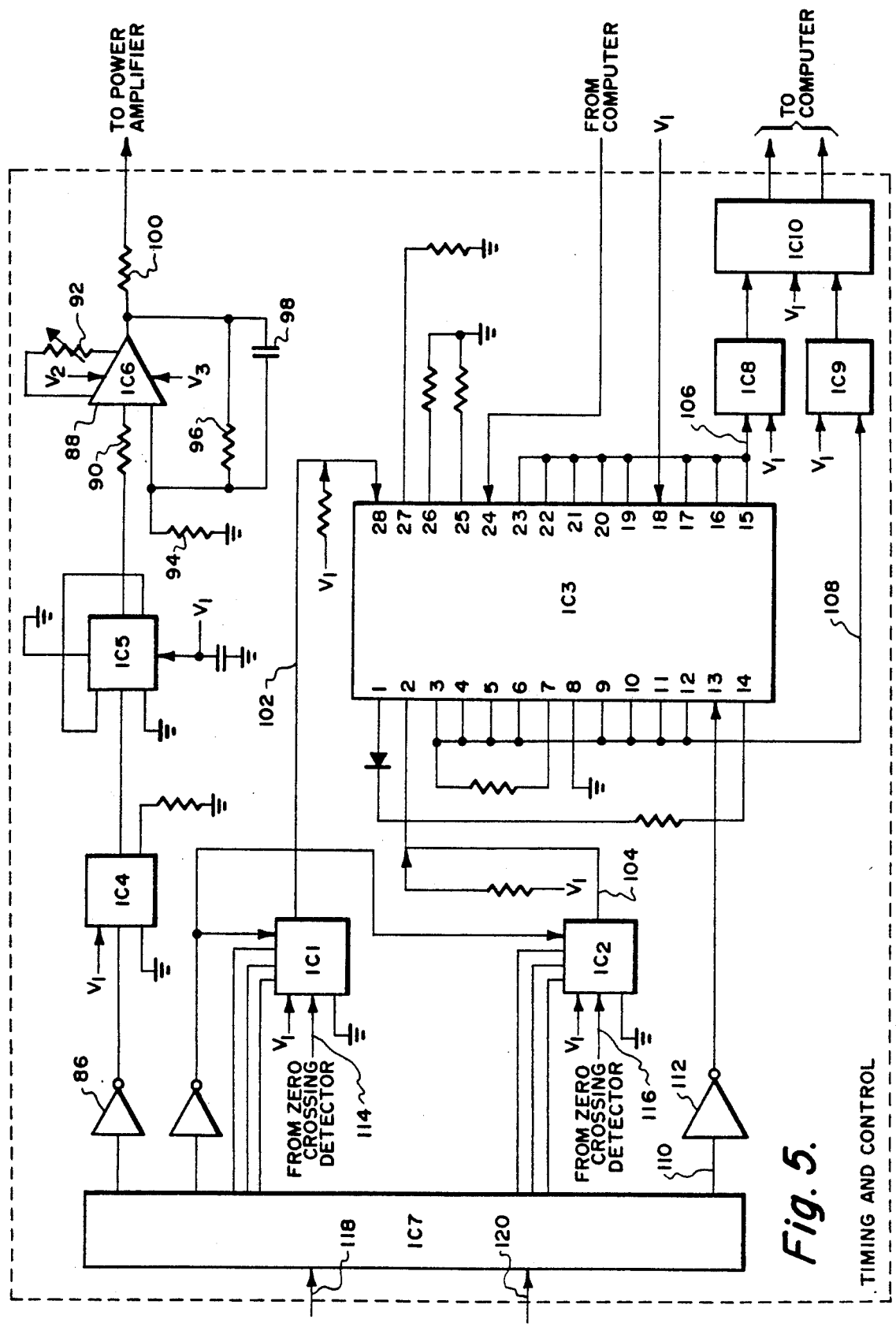
FIG. 5 is an electronic schematic diagram showing in more detail the circuitry utilized within the timing and control portion of the block diagram of FIG. 4.

The timing and control circuit 66 is shown more specifically in FIG. 5. This circuit provides two major functions which are (1) the excitation signal for the power amplifier and the transmit transducers 30 and (2) the time interval measurement of the received signal from the receive transducers 32. The computer 58 provides for timing, control and data acquisition functions through IC7 and IC10.

Within the timing and control circuit, the excitation signal is initiated at IC7, through inverter 86 to a gated oscillator IC4. The function of the inverter 86 is to change the signal to the right polarity. A satisfactory type of inverter is a hex inverter, Model No. 54S/74S04, manufactured by National Semiconductor Corporation of Santa Clara, Calif.

The gated oscillator IC4 provides a square wave burst of programmable length and fixed frequency determined by a signal applied to IC4. IC4 is coupled to a divide circuit shown by IC5. The IC5 is part number 54S/74S74, again manufactured by National Semiconductor Corporation, defined as a dual D-type positive edge-triggered flip-flop. This flip-flop provides a proper frequency to power amplifier 68 and the transducers 30. The output of IC5 is coupled by way of resistor 90 to amplifier 88. A desirable model of amplifier 88 is what is manufactured by Radio Corporation of America, part number CA3100, entitled Wide Band Operational Amplifier. Amplifier 88 provides both level shifting, by means of potentiometer 92, and gain by means of feedback network composed of resistors 94 and 96 and capacitor 98. The output of amplifier 88 is coupled to power amplifier 68 by way of resistor 100.

The function of IC5 is to lower the frequency of the output of IC4. IC5 and IC4 are to both be supplied input voltage of $V_1$.

The elapsed time, or the time interval measurement between the transmit and receive signals of the transducers 30 and 32, is calculated by a circuit represented by IC1, IC2 and IC3 of FIG. 5. IC1 and IC2 act as programmable pulse discriminators controlled by IC7. The single cycle of the pulses received from the transmitting and receiving transducers 30 and 32 are selected and conditioned for transmission to IC2 and IC3. A typical model for IC3 would be an 8-Digit Multifunction Frequency Counter/Timer, part number ICM7216B, manufactured by General Electric Intersil Corporation of Cupertino, Calif. IC3 is configured for a high resolution time interval measurement. External oscillator input is derived from the internal oscillator of the computer 58. The transmit signal is supplied through conductor 102 The received transducer signal is supplied through conductor 104. Counter reset control is provided by IC7 to clear the counter after a measurement cycle has been completed.

IC3 automatically performs the time interval measurements and presents its output data multiplexed to two eight bit busses through data lines 106 and 108. Data line 106 connects to IC8 and data line 108 connects to IC9. IC8 and IC9 are identical and are defined as Octal Buffer/Line Drivers, Model No. 74S241, by National Semiconductor Corporation. IC8 and IC9 are both supplied voltage $V_1$. IC8 and IC9 convert the signals to a desired level that is compatible to IC10. The outputs of IC8 and IC9 are supplied to IC10. Referring particularly to FIG. 5, the reset pulse of IC7 is transmitted through conductor 110 and through inverter 112 to pin number 13 of IC3. Conductor 114 from the zero crossing detector 78 connects to IC1. Conductor 116 from zero crossing detector 78 connects to IC2. Conductors 118 and 120 connect the peripheral controllers to the timing and control circuitry 66. The timing and control circuitry 66 is to produce a low distortion square wave with a maximum amount of energy per pulse.

Figure 7:
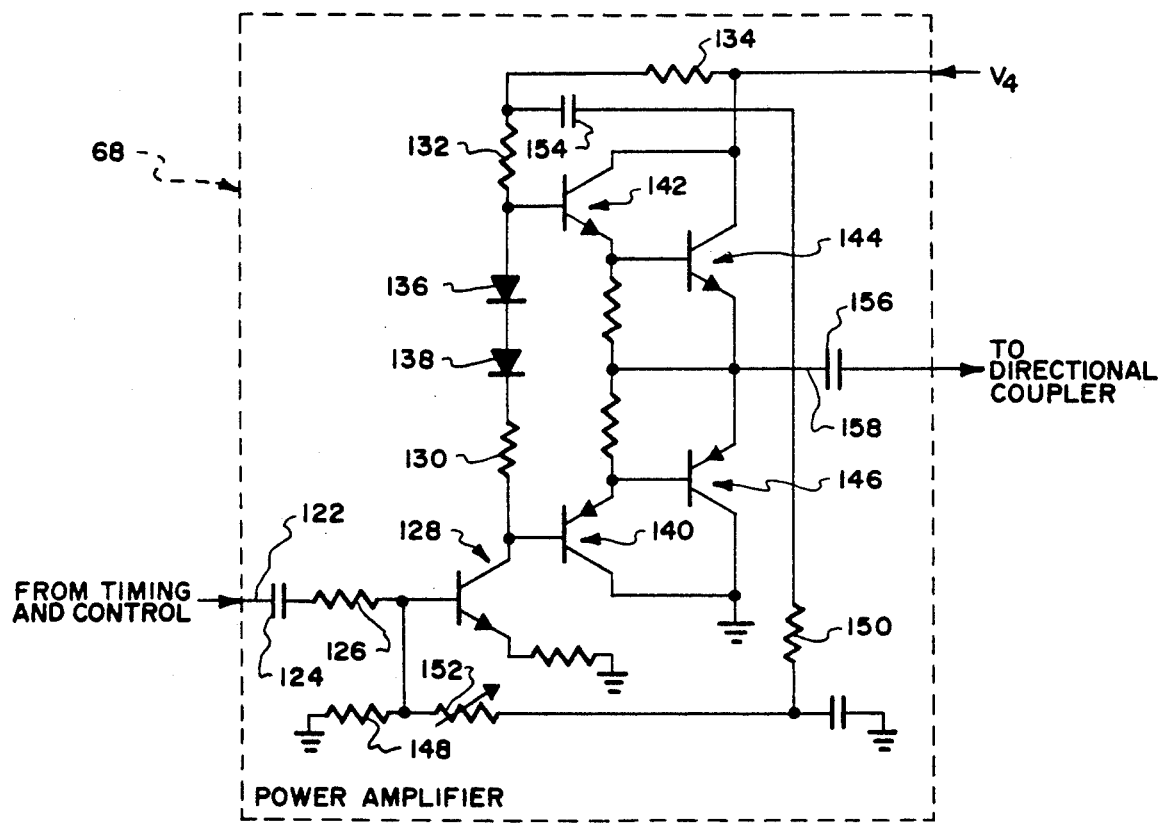
FIG. 7 is an electronic schematic diagram of the power amplifier shown in block diagram form in FIG. 4.

Referring particularly to FIG. 7, there is shown the circuit for the power amplifier 68. The circuit for the power amplifier 68 has the function of driving the transmitting transducer 30. The power amplifier circuit 68 can take on a variety of configurations but a typical implementation of a complimentary symmetry power amplifier is adequate to drive the low impedance loads of the acoustic transducers 30. The input from the timing and control circuit 66 through conductor 122 is coupled by way of capacitor 124 and resistor 126 to the base of the drive transistor 128. A General Electric Corporation, D44H transistor would be satisfactory. Resistor 130, 132 and 134 are coupled with diodes 136 and 138 to provide the bypass currents and voltages required for transistor 128 as well as transistors 140, 142, 144 and 146. The diodes 136 and 138 provide the stability for the output of transistors 140, 142, 144 and 146. The voltage mode feedback path is provided through resistors 148, 150 and variable resistor 152. Additional feedback is provided to increase the overall gain of transistor 128 by capacitor 154. The output transistors 140, 142, 144 and 146 could each be the same such as Model No. D44E of General Electric Corporation. The transistors 140, 142, 144 and 146 are capacitively coupled by capacitor 156 through output line 158 to directional coupler 70 and hence to relay 80.

Figure 6:
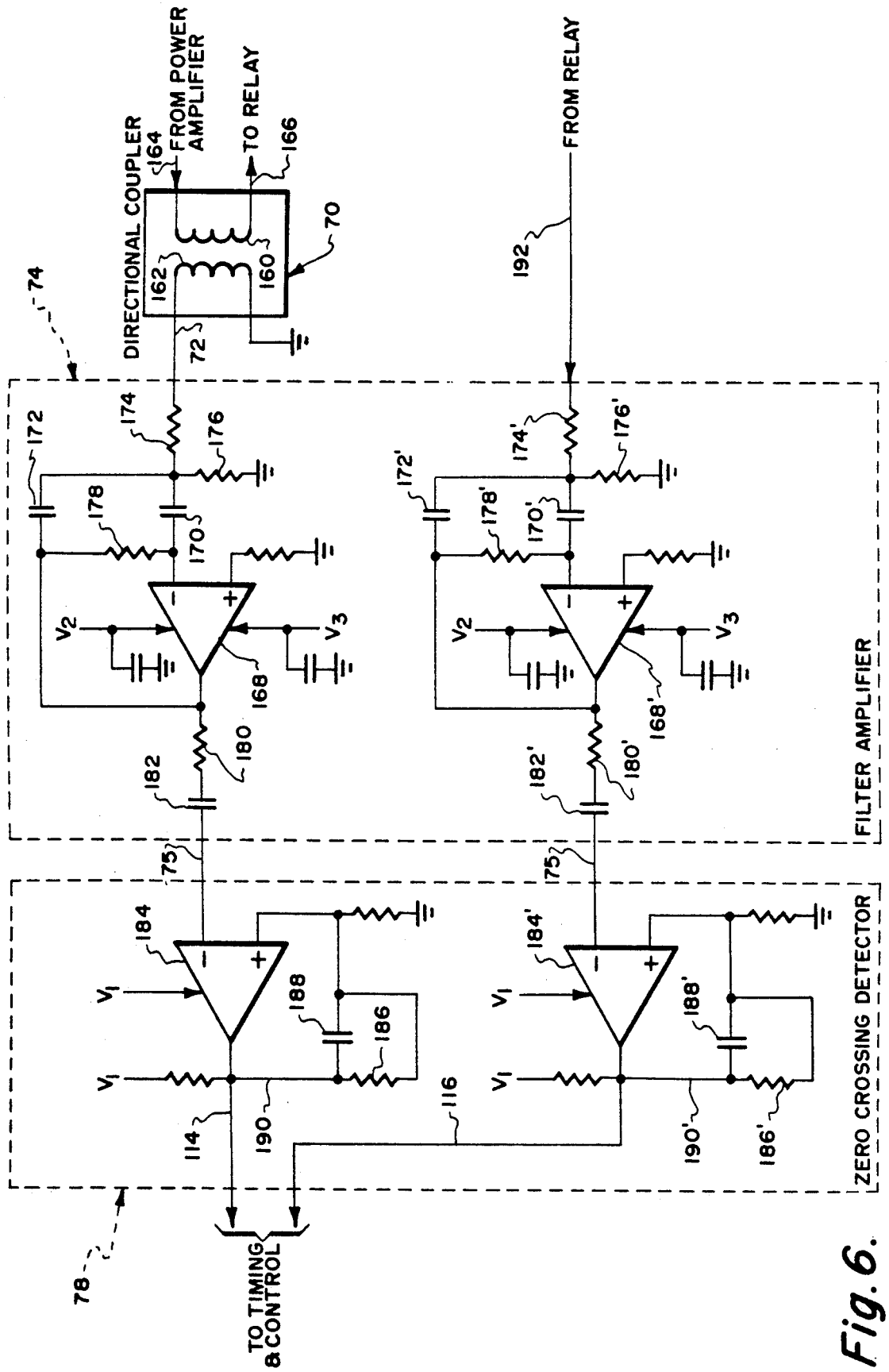
FIG. 6 is an electronic schematic diagram clearly showing the circuitry utilized within the zero crossing detector, filter amplifier and directional coupler shown in block form within FIG. 4.

FIG. 6 depicts a typical example of a circuit for the filter amplifier 74 and the zero crossing detector 78. The purpose of the filter amplifier 74 and the zero crossing detector 78 is to convert a sample of the transmitted pulse that is being transmitted to the transducers 30 and the signal that is received by the transducers 32 from an analog signal to a digital signal which is then measured for a time interval between the transmit and the receive signals. The diverted transmitted signal starts the timing process. The received signal stops the timing process. The time interval therebetween is calculated.

The circuitry shown in FIG. 6 obtains the diverted signal from the directional coupler 70. This directional coupler 70 includes a main coil 160 and a diverted coil 162. The main signal is transmitted from the power amplifier 68 through conductor 164. The main signal from the directional coupler 70 is transmitted through conductor 166 to relay 80. The coil 162 picks up a low level sample from the transmitted signal which is then conducted through conductor 72 to the inverting input of amplifier 168 which is acting as an active bandpass filter. Associated with the amplifier 168 is a feedback network comprised of capacitors 170 and 172 and resistors 174, 176 and 178 providing bandpass filtering with signal gain in the desired passband. The output of this feedback network is then conducted through resistor 180 and is AC-coupled through capacitor 182 to the inverting input of a differential comparator 184. The comparator 184 detects the zero-crossing points of the input pulse and provides a level output within conductor 114. Conductor 114 connects to one of the input points of the timing and control circuit 66. Associated with comparator 184 is a resistor 186 and a capacitor 188 to provide hysteresis in a positive feedback loop 190 of the comparator 184. This feedback loop 190 is to negate any noise not removed by the filter amplifier 74 to eliminate any false triggering of the time determining circuit.

The received signal within conductor 192 from relay 82 is processed in exactly the same way that the signal within conductor 72 is processed. Therefore, identical numerals with a prime sign have been utilized to refer to similar parts and for a discussion as to transmitting of the signal from conductor 192 into conductor 116, reference is to be had to the discussion applicable to those numerals.

The relays 80 and 82 are operationally connected together as denoted by line 194. The relay 82 is basically an analog switch which selects the signal from the appropriate receiving transducer 32 and couples the signal through conductor 192 into the inverting input of the operational amplifier 168'. This analog switch 82 is connected to the computer 58 through IC6 of the peripheral controlling circuit 64 with this connection occurring by conductor 196. It is through the conductor 196 that the computer selects the appropriate transmit/receive transducer pair by way of software. Computer control of the relay 82 is provided by IC6 (see FIG. 11). A desirable device for IC6 would be an Intel Corporation 8255 programmable peripheral interface which has previously been mentioned. IC6 provides address and control translation from the address of the computer 58 and control busses to the peripheral controlling circuit 64.

Referring in particular to FIG. 4, the conductor 196 is actually shown as three separate conducting lines between the peripheral controlling circuit 64 and the relay 80. It is to be understood that in actual practice the conducting lines 196 will also be directly connected to relay 82 as is shown within FIG. 11.

Figure 10:
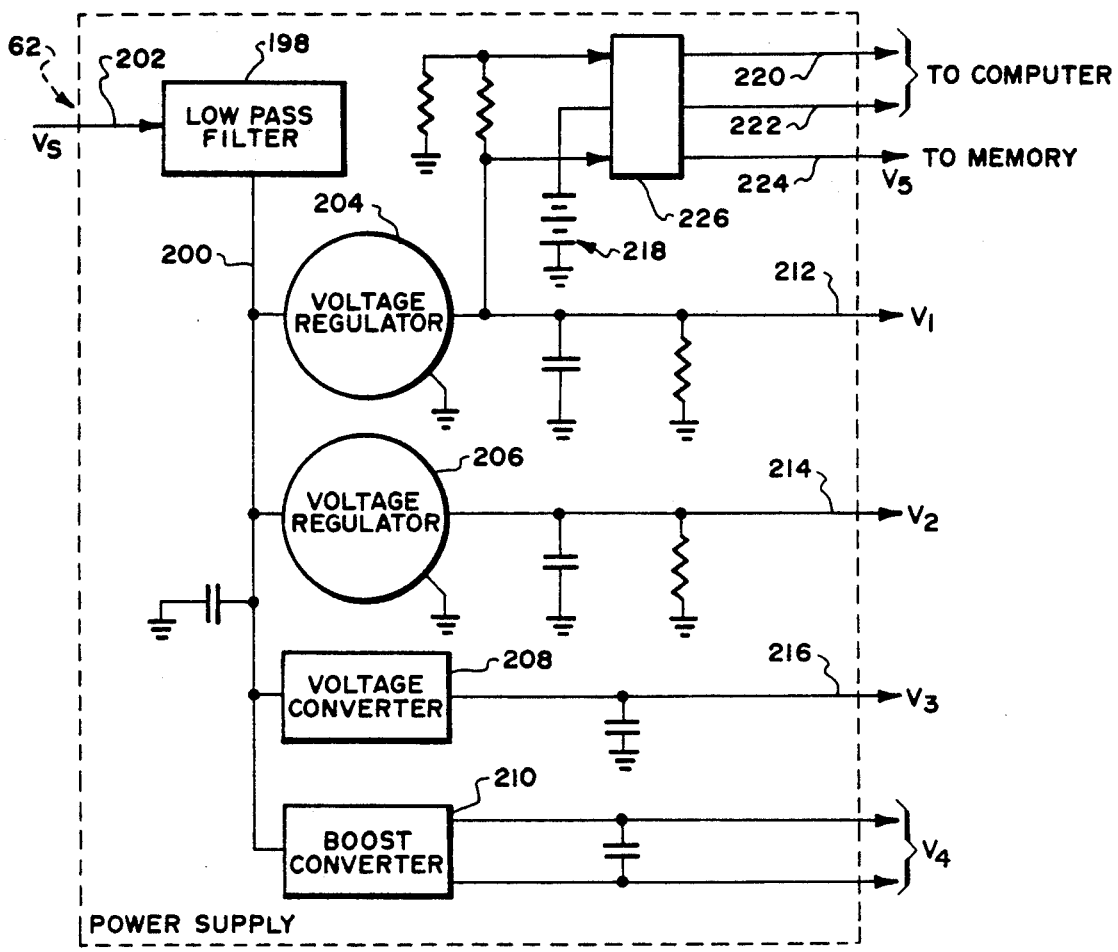
FIG. 10 is an electronic schematic view of the power supply shown in block diagram form in FIG. 4.

The circuit for the power supply 62 is shown in FIG. 10. This power supply circuitry provides five different filtered and regulated voltages for the entire apparatus of this invention. There is also a power supply monitor circuit with battery backup to protect the computer 58 and its memory circuitry from low voltage conditions (less than plus two volts).

A source voltage Vs is to be supplied into a low pass filter 198. The low pass filter 198 is designed for DC current only. The output of the low pass filter 198 is conducted into line 200. This low pass filter is a commercially available unit whose function is to suppress noise which is present on the power supply input line 202.

The output line 200 from the low pass filter 198 is connected to a first voltage regulator 204, a second voltage regulator 206, a voltage converter 208 and a boost converter 210. The voltage regulators 204 and 206 are conventionally purchaseable products from National Semiconductor, Inc., Model No. LM340. Voltage regulator 204 produces an output within conductor 212 with this output being $V_1$. Voltage regulator 206 produces an output within conductor 214 which is $V_2$. Typical voltage for $V_1$ would be plus 5.0 volts. Typical voltage for $V_2$ would be +10.0 volts.

The voltage converter 208 is provided to convert the positive supply voltage within conductor 200 to a regulated negative voltage. Voltage converters are deemed to be conventional and produce a voltage $V_3$ within its output line 216. Typical voltage for $V_3$ would be a −10.0 volts.

The boost converter 210 is again a conventionally purchaseable product such as part E-500, manufactured by Endicott Research Group of Endicott, N.Y. It is the function of the boost converter 210 to provide an increase in the DC voltage from line 200. Typical voltage output of the boost converter is $V_4$ which is plus or minus one hundred volts.

The primary driving voltage throughout the apparatus of the present invention is $V_1$. This voltage $V_1$ is transmitted to both the computer 58 and the memory 60 as well as many of the other components of the apparatus of this invention. However, within the computer 58 and the memory 60 are preprogrammed memory chips.

If for any reason there is a loss of voltage to computer 58 and memory 60, or a decrease of the voltage below a certain level, then the preprogrammed memory within computer 58 and memory 60 would be lost. To avoid this, it is desirable to use a battery backup circuit which monitors the output of voltage regulator 204 within line 212 and if the voltage within line 212 is lost, even momentarily, the battery 218 is utilized to maintain a continuous voltage through lines 220 and 222 to the computer 58 and in line 224 to memory 60. The voltage transmitted to memory 224 is referenced as $V_5$ with this voltage being 3.0 volts.

Included within the battery backup circuit is a watch dog unit 226. This watch dog unit 226 is again a purchaseable product such as Model MAX 690, manufactured by Maxim Corporation of Sunnyvale, Calif. This watch dog unit 226 is to detect any power failure. The unit 226 then begins a shutdown routine by transmitting a signal through the interrupt line 220. During this period of time, voltage $V_1$ *is sustained*.

If voltage $V_1$ beings to fall, but is still above the watch dog unit's 226 minimum operating voltage, the watch dog unit 226 switches to the reset mode through line 222. In this position, the memory within the computer 58 is still protected. If voltage $V_1$ falls further, complete switching to the battery voltage 218 occurs it is to be noted that during this entire time a minimum voltage of three volts, $V_5$ is transmitted to the memory 60 preventing loss of the memory 60.

If for any reason the voltage of battery 218 begins to fall, the unit 226 is capable of switching to a further low powered condition at some further diminished voltage level. This minimum voltage level will be transmitted to the computer 58 as well as to the memory 60. If for any reason the voltage within battery 218 is lost, then the memory in both the computer 58 and the memory 60 will be lost. However, it is believed that this situation would be very unusual.

It is to be noted that comparing the detailed description of this invention to the attached drawings, there are included resistors, capacitors, and semi-conducting devices, which have not been specifically called out. Inclusion of these components are for biasing, timing and other exceedingly conventional normal functions of any electronic circuit. Therefore, it is believed to not be necessary to specifically describe these components and their functions.

What is claimed:

1. A method of determining the weight of a structure comprising the steps of:
    mounting a transmitting acoustical transducer and a receiving acoustical transducer in a spaced apart manner on a load bearing member of said structure;
    emitting an acoustic wave from said transmitting acoustical transducer within said load bearing member;
    picking up said acoustic wave by said receiving acoustic transducer;
    determining the elapsed time of transmission of said acoustic wave from said transmitting acoustical transducer to said receiving acoustical transducer;
    comparing said elapsed time to a graphical representation where said graphical representation has been previously calculated in view of known weights of said structure and ascertained elapsed times with there being a different point on said graph for each particular lapsed time and weight; and arriving at and displaying a weight for said structure.

2. The method as defined in claim 1 wherein the step of determining, comparing and arriving at are accomplished by computer.

3. A weight determining apparatus comprising:
   means for transmitting an acoustic wave within the structure to be weighed;
   means for receiving said wave;
   means for calculating the elapsed time between the initiating of the transmitting of the wave to the receiving of the wave;
   means for comparing the elapsed time to previously ascertained elapsed times for said structure where the weight was known for each said previously ascertained elapsed time;
   means for arriving at a current weight for said structure and displaying the value of said current weight.

4. The weight determining apparatus as defined in claim 3 wherein:
   said means for arriving at comprising a computer.

5. The weight determining apparatus as defined in claim 3 wherein:
   both said means for transmitting and said means for receiving being fixedly mounted on a load bearing member of said structure in a known distance spaced apart arrangement.

6. A method of determining the weight of a structure comprising the steps of:
   utilizing a computer;
   transmitting an acoustical wave through a load bearing member of said structure for a plurality of known different weights with there being a separate said wave for each said weight;
   receiving each said acoustical wave with said receiving occurring some known spaced distance from the point of said transmitting;
   measuring the elapsed time between said transmitting and receiving for each said weight;
   programming said computer with said elapsed times and said weights producing a weight versus time curve within said computer;
   changing the weight of said structure producing a current weight;
   transmitting an acoustical wave through said load bearing member of said structure;
   receiving said acoustical wave for said current weight maintaining said spaced distance between the point of transmitting and the point of receiving;
   measuring the elapsed time between said transmitting and receiving for said current weight;
   inputting said elapsed time for said current weight into said computer;
   comparing said elapsed time to said curve within said computer arriving at a known value for said current weight; and
   displaying said value.

7. In combination with a truck, said truck being for the purpose of carrying a load, said load being increasable, said truck having at least one load carrying axle, a weight determining apparatus mounted in conjunction with said truck, said weight determining apparatus comprising:
   acoustic wave transmitting means mounted on said axle, said acoustic wave transmitting means for emitting an acoustic wave into said axle;
   acoustic wave receiving means mounted on said axle, said acoustic wave receiving means being spaced from said acoustic wave transmitting means, said acoustic wave receiving means for picking up said acoustic wave; and
   computer means mounted within said truck, said computer means to measure the elapsed time between the transmitting and receiving of said acoustic wave and compare such to known elapsed times versus weight values to thereby ascertain the current weight of said truck upon said axle.

8. The combination as defined in claim 7 wherein:
   both said acoustic wave transmitting means and said acoustic wave receiving means being fixedly mounted on said axle.

9. The combination as defined in claim 8 wherein:
   said acoustic wave receiving means being located a known spaced distance from said acoustic wave transmitting means.

10. The combination as defined in claim 9 wherein:
    a display, said display being connected to said computer means, said display being activatable by said computer means to display indicia representing the value of said current weight.

11. The combination as defined in claim 7 wherein:
    said acoustic wave transmitting means including a plurality of separate transmitting transducers.

12. The combination as defined in claim 11 wherein:
    said acoustic wave receiving means comprising a plurality of receiving transducers.

13. The combination as defined in claim 12 wherein:
    number of said receiving transducers being equal to the number of said transmitting transducers.

14. The combination as defined in claim 13 wherein:
    only a single said transmitting transducer and a single said receiving transducer being activated at any given instant, there being a particular receiving transducer to be activated for a particular said transmitting transducer.

* * * * *